United States Patent
Su et al.

(10) Patent No.: US 12,113,754 B1
(45) Date of Patent: Oct. 8, 2024

(54) INCORPORATING INTERNET OF THINGS (IOT) DATA INTO CHATBOT TEXT ENTRY DATA

(71) Applicant: International Business Machines Corporation, Armonk, NY (US)

(72) Inventors: Jun Su, Beijing (CN); Yang Liang, Beijing (CN); Su Liu, Austin, TX (US); Karen Beale, Mitchellville, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/381,077

(22) Filed: Oct. 17, 2023

(51) Int. Cl.
G06F 15/16 (2006.01)
G16Y 20/40 (2020.01)
H04L 51/02 (2022.01)

(52) U.S. Cl.
CPC .............. *H04L 51/02* (2013.01); *G16Y 20/40* (2020.01)

(58) Field of Classification Search
CPC ................................ H04L 51/02; G16Y 20/40
See application file for complete search history.

(56) References Cited

U.S. PATENT DOCUMENTS

| | | | |
|---|---|---|---|
| 11,005,786 B2 | 5/2021 | Zhang et al. | |
| 11,159,457 B2 | 10/2021 | Liang et al. | |
| 11,361,211 B2 | 6/2022 | Manaharlal Kakkad et al. | |
| 2018/0082184 A1 | 3/2018 | Guo et al. | |
| 2018/0260738 A1* | 9/2018 | Gabbai | G06N 20/00 |
| 2022/0084673 A1* | 3/2022 | Suzuki | H04L 51/02 |
| 2022/0188304 A1* | 6/2022 | Samal | G10L 15/22 |

FOREIGN PATENT DOCUMENTS

| | | |
|---|---|---|
| IN | 202321025129 A | 5/2023 |
| IN | 202321036400 A | 6/2023 |
| KR | 102293743 B1 | 8/2021 |
| WO | 2020005766 A1 | 1/2020 |

OTHER PUBLICATIONS

Kaed et al., "A Semantic Based Multi-Platform IoT Integration Approach from Sensors to Chatbots." Global Internet of Things Summit (GIoTS), Jun. 2018, 7 pages, retrieved from https://www.researchgate.net/publication/324532727_A_Semantic_Based_Multi-Platform_IoT_Integration_Approach_from_Sensors_to_Chatbots.

* cited by examiner

*Primary Examiner* — Joseph R Maniwang
(74) *Attorney, Agent, or Firm* — Zilka-Kotab, P.C.

(57) ABSTRACT

A computer-implemented method, according to various approaches, includes parsing a first collection of data into a plurality of elements. A first sub-set of the elements includes text entry data and a second sub-set of the elements includes IoT data. In response to a determination that the text entry data does not satisfy a predetermined threshold of specificity, the first collection of data is rephrased into a second collection of data. The method further includes causing the second collection of data to be sent to a determined chatbot server and causing a first output of the determined chatbot server to be returned to a first user device. The first output is an answer to the second collection of data.

20 Claims, 9 Drawing Sheets

| Time Line | User ID | ChatBot ID | Question ID | IoTList[IoTID][IoTData] | OriginalRequest | IoTEnhancedRequest | OriginalAnswer | IoTEnhancedAnswer |
|---|---|---|---|---|---|---|---|---|
| Time-1 | NULL | NULL | NULL | NULL | NULL | NULL | NULL | NULL |
| Time-2 | User 01 | Chatbot 01 | Q0001 | Phone type 1, operating system type 1 message: "Charging on Hold"; Battery Temperature: 60 degrees C | "How can I fix my phone?" | "How can I fix a battery charging problem with abnormal temperature (60 degrees C) in my phone type 1, operating system type 1?" | Are you using phone type 1 or type 2? Please call an 800 number to get customer support. | Yes, this is a known problem because of defect XYZ in operating system type 1. Please update your operating system to type 2. |
| ... | ... | ... | ... | ... | ... | ... | ... | ... |

FIG. 5

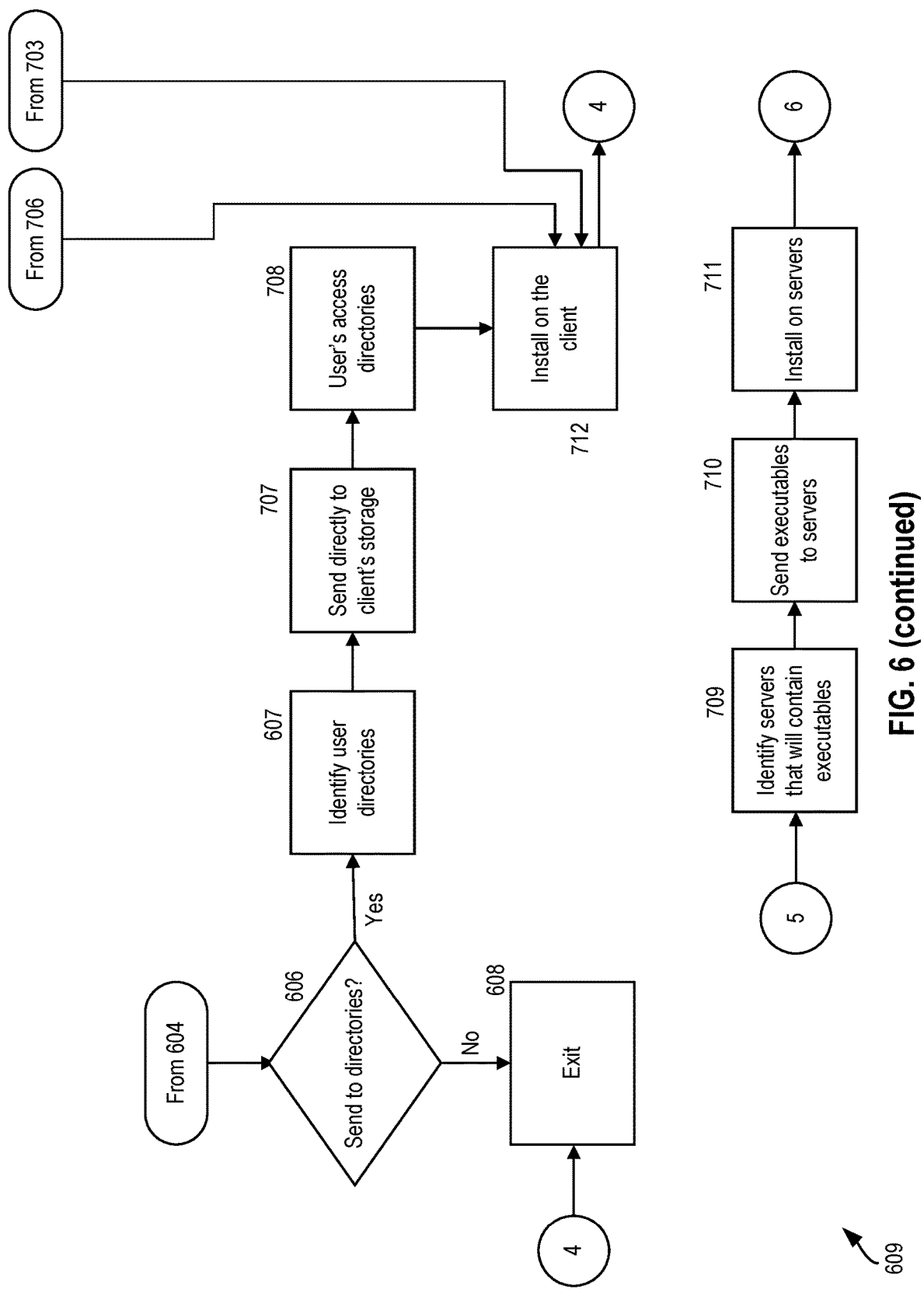

INCORPORATING INTERNET OF THINGS (IOT) DATA INTO CHATBOT TEXT ENTRY DATA

BACKGROUND

The present invention relates to chatbots, and more specifically, this invention relates to incorporating Internet of Things (IoT) data into chatbot text entry data.

Artificial intelligence (AI) chatbots are relatively intelligent virtual agents designed to simulate human-like conversations. These chatbots employ natural language processing (NLP), machine learning, and other AI techniques to understand user queries, generate appropriate responses, and provide valuable information or assistance while interacting with user devices and/or input.

The IoT, on the other hand, includes a network of physical objects embedded with sensors, software, and connectivity, enabling data to be collected and exchanged within the network. These physical objects may include various devices such as smart appliances, wearable devices, environmental sensors, security cameras, and more. The data generated by these sensors provides valuable insights into the physical world, including temperature, humidity, motion, energy consumption, and other environmental factors.

SUMMARY

A computer-implemented method, according to various approaches, includes parsing a first collection of data into a plurality of elements. A first sub-set of the elements includes text entry data and a second sub-set of the elements includes IoT data. In response to a determination that the text entry data does not satisfy a predetermined threshold of specificity, the first collection of data is rephrased into a second collection of data. The method further includes causing the second collection of data to be sent to a determined chatbot server and causing a first output of the determined chatbot server to be returned to a first user device. The first output is an answer to the second collection of data.

A computer program product, according to various approaches, includes a computer readable storage medium having program instructions embodied therewith. The program instructions are readable and/or executable by a computer to cause the computer to perform any combination of features of the foregoing methodology.

A system, according to various approaches, includes a processor, and logic integrated with the processor, executable by the processor, or integrated with and executable by the processor. The logic is configured to perform any combination of features of the foregoing methodology.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 5 is a table, in accordance with one approach of the present invention.

DETAILED DESCRIPTION

Figure 1:
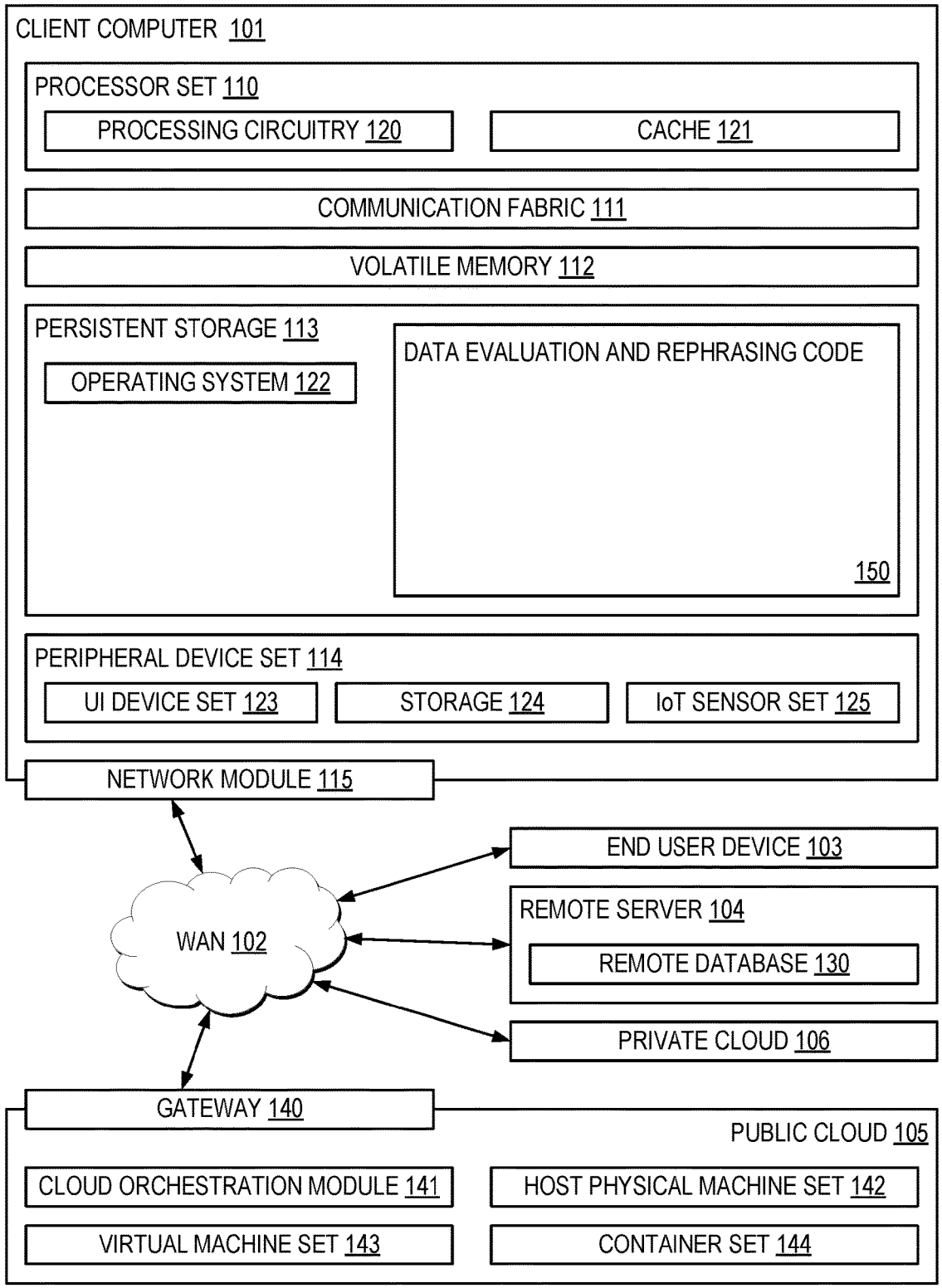
FIG. 1 is a diagram of a computing environment, in accordance with one approach of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for incorporating IoT data into chatbot text entry data.

In one general approach, a computer-implemented method includes parsing a first collection of data into a plurality of elements. A first sub-set of the elements includes text entry data, and a second sub-set of the elements includes IoT data. In response to a determination that the text entry data does not satisfy a predetermined threshold of specificity, the first collection of data is rephrased into a second collection of data. The second collection of data is caused to be sent to a determined chatbot server. The method further includes causing a first output of the determined chatbot server to be returned to the first user device, where the first output is an answer to the second collection of data.

As a result of the parsing, the IoT data is identified and available for optionally supplementing the text entry data. This parsing consumes far less processing resources than outputting and processing additional queries (e.g., to supplement the text entry data) would otherwise consume. Accordingly, the processing potential of a processing circuit performing the method operations is improved by these processing resources remaining available. By rephrasing the first collection of data into the second collection of data, additional inquiries are not output to supplement a context determined to be lacking in the first collection of data. Accordingly, a technical effect of this rephrasing includes a reduction of network traffic in a network that includes a first user device that the text entry data is input on. Furthermore, the rephrasing provides a chatbot server (that at least some of the first collection of data is routed to) with an amount of data, e.g., the second collection of data, that a relatively accurate answer is able to be generated from. Sending the second collection of data to the determined chatbot server enables the chatbot server to generate an answer to questions of the second collection of data. Because the second collection of data includes data that is rephrased to satisfy the predetermined threshold of specificity, an on point answer is able to be generated. This mitigates the need for additional clarifying processing operations to be performed. Causing the first chatbot output to be returned to the first user device provides a user that entered at least some of the text entry data an answer to a question of the text input data. This way, processing that would have otherwise been consumed by manually attempting to determine an answer on the first user device is preserved.

In some approaches, the text entry data is a question that was entered into a chatbot interface of the first user device. Processing text entry data, and more specifically, a question that was entered into a chatbot interface of the first user device potentially provides at least a partial context of what is to be answered.

The IoT data, in some approaches, includes metrics generated based on measurements performed by sensors, and device information. Obtaining different types of IoT data increases the likelihood that at least some of the IoT data correlates to at least some of the text entry data. For context, having at least some of the IoT data correlate to at least some of the text entry data enables the text entry data to be supplemented by the IoT data in response to a determination that the text entry data does not satisfy the predetermined threshold of specificity. This supplementation may be performed without having to rely on performing additional queries with the first user device, and thereby mitigates network communication operations that might otherwise be performed to supplement a context determined to be lacking in the text entry data. This relative reduction in network communication operations has a technical effect of improving the throughput of a network that includes the first user device and/or a device performing operations of the method and/or the determined chatbot server.

Rephrasing the first collection of data into the second collection of data may include: identifying a first element of the second sub-set of the elements that includes IoT data that correlates to the text entry data, and integrating the IoT data of the first element in the text entry data. By integrating the IoT data into associated text elements in the text entry data, a context that was otherwise intended but not included in a question of the first collection of data, is ensured to be present in the second collection of data. This context is produced without having to otherwise output and process additional queries to obtain additional information for the second collection of data.

In some approaches, in response to a determination that the text entry data satisfies the predetermined threshold of specificity, the text entry data is caused to be sent to the determined chatbot server. Causing the text entry data determined to satisfy the predetermined threshold of specificity to be sent to the determined chatbot server ensures that processing is not otherwise expended on rephrasing collections of data that include a sufficient amount of context.

A second output of the determined chatbot server may be caused to be returned to the first user device, where the second output is an answer to the text entry data. Causing the second output to be returned to the first user device provides a user that entered at least some of the text entry data an answer to a question of the text input data. Processing that would have otherwise been consumed by manually attempting to determine an answer on the first user device is preserved.

The method, in some approaches, further includes determining whether the text entry data satisfies the predetermined threshold of specificity. Determining whether the text entry data satisfies the predetermined threshold of specificity may include: determining whether an answer with at least a predetermined degree of detail exists for the text entry data.

The determination of whether the text entry data satisfies the predetermined threshold of specificity is performed in order to ensure that supplementation processing is not performed where the text entry data already includes a sufficient amount of context, e.g., satisfies the predetermined threshold of specificity. Furthermore, the determination is performed in order to relatively reduce an amount of time that returning an answer to the first user device takes, thereby improving network throughput. This is because the determination allows cases to be identified in which supplementation processing is to not be performed. These cases are ones in which the text entry data satisfies the predetermined threshold of specificity.

In some approaches, in response to a determination that an answer with at least the predetermined degree of detail exists for the text entry data, the method includes determining that the predetermined threshold of specificity is satisfied. Determining whether the predetermined degree of detail exists for the text entry data ensures that IoT data is only added to collections of data that are lacking context. This selective supplementation has the technical effect of ensuring that processing resources are not expended processing collections of data that include an insufficient amount of context. Rather, the processing is delayed until a supplementation is performed to generate a collection of data that includes at least the predetermined threshold of specificity. A question that does not have at least the predetermined degree of specificity otherwise being processed by an AI chatbot server wastes processing resources, because an answer returned by the AI chatbot server is likely to not be on point, e.g., not answer an intended context of the question that is not discernible within the question based on the lack of detail provided in the text entry data.

Causing the output(s) of the determined chatbot server to be returned to a first user device, in some approaches, includes: rendering the output(s) of the determined chatbot server to a predetermined sentence structure, and outputting the rendered output(s) to the first user device. This rendering allows output(s) to be delivered to the user device in a form that can be presented to the user that input at least some of the text entry data into the chatbot interface of the first user device. This rendering reduces the amount of data that is ultimately transmitted to the first user device in the event that the rendering cuts out at least some of the output that is determined to not be of the form that can be presented on the first user device. Furthermore, this rendering mitigates device processing operations that would otherwise potentially be performed in order to clarify a meaning of the output(s), e.g., a request for clarification returned by the first user device.

The method, in some approaches, further includes receiving, from the first user device, feedback about the first output, and determining whether the feedback is positive feedback. In response to a determination that the feedback is not positive feedback, the predetermined threshold of specificity is increased. This selective adjustment of the predetermined threshold of specificity ensures that users are satisfied with outputs returned to the first user device, and if not, adjustments are made in an attempt to gain such satisfaction. These adjustments ensure that answers provided in the outputs returned to the first user device accurately answer questions previously input into the first user device, thereby reducing the likelihood that follow-up questions have to be processed, e.g., to clarify a relatively inaccurate answer.

Interactions with the first user device may be caused to be monitored by a plurality of sensors, where information obtained as a result of the monitoring is the IoT data. The IoT data obtained as a result of monitoring the interactions is available for use to supplement text entry data input on the first user device. This way, for a received collection of data, text entry data of the collection of data may be optionally supplemented with the obtained IoT data, without having to otherwise output and process additional queries to obtain additional information for the supplementation. These avoided queries reduce the amount of processing that would otherwise be performed in the event that the IoT data was not monitored and obtained.

The method, in some approaches, includes determining the chatbot server from a plurality of potential chatbot servers. Consideration of the plurality of potential chatbot servers increases the likelihood that a chatbot server is available to process the collection(s) of data described herein at any given time. Accordingly, latency in the process of returning an answer to the first user device is relatively reduced. In some approaches, the chatbot server is determined based on preference information of a user that entered the text entry data on the first user device. Incorporation of user preferences identified in the preference information into the determination of the chatbot server ensures that collection(s) of data are not otherwise processed by chatbot servers that the user does not want to use for processing the collection(s) of data. This incorporation furthermore reduces the likelihood of an additional iteration of processing being performed on the first collection of data in response to receiving feedback that a collection of data was processed by a chatbot server that does not match the user preferences.

In various preferred approaches, a computer-implemented method includes parsing a first collection of data into a plurality of elements, where a first sub-set of the elements includes text entry data, and a second sub-set of the elements includes IoT data. In response to a determination that the text entry data does not satisfy a predetermined threshold of specificity, the first collection of data is rephrased into a second collection of data. A chatbot server is determined, based on preference information of a user that entered the text entry data on the first user device, from a plurality of potential chatbot servers. The second collection of data is caused to be sent to the determined chatbot server. A first output of the determined chatbot server is caused to be returned to a first user device, where the first output is an answer to the second collection of data.

The preferred approaches above enable efficiency improvements in the process of an answer being determined by a determined chatbot server for a question input on a chatbot interface of a user device. For example, the parsing mentioned described above to determine the plurality of elements consumes relatively far less processing resources than outputting and processing additional queries (to supplement the text entry data) would otherwise consume in order to expand on a context provided in text input data. Accordingly, the processing potential of a processing circuit performing the method operations is improved by these processing resources remaining available. Similarly, by rephrasing the first collection of data into the second collection of data, additional inquiries are not output to supplement a context determined to be lacking in the first collection of data. Accordingly, a technical effect of this rephrasing includes a reduction of network traffic in a network that includes a first user device that the text entry data is input on. Furthermore, the rephrasing provides a chatbot server with an amount of data that a relatively on point answer may be generated based on, e.g., based on an extent of the context in the data provided to the chatbot server. This context is ensured to be present in the collection of data by supplementing the text entry data with IoT data during the rephrasing, without having to rely on the output of supplemental queries to the first user device. More specifically, the rephrasing mitigates the need for additional clarifying processing operations to be performed thereafter, which would otherwise likely be performed in response to a non-relevant answer being returned to the first user device. Accordingly, processing resources are preserved throughout the network. Causing the first chatbot output to be returned to the first user device provides a user that entered at least some of the text entry data an answer to a question of the text input data. This way, processing and time that would have otherwise been consumed by manually attempting to generate an answer on the first user device is preserved. Furthermore, the quality of an answer that is output by the determined chatbot server is relatively more on point as a result of the operations of various approaches above. This has the technical effect of reducing overhead that would be incurred by otherwise processing follow up questions subsequent to an inaccurate answer being returned to the first user device.

One use case of the preferred approaches above includes deploying the operations in a network in which user devices host user-friendly applications with narrated help chat features. Users of narrated chat windows typically aim to obtain answers to their questions relatively quickly, and thereby often fail to disclose a sufficient about of context in questions of their text entry data. Furthermore, these users may be unaware of one or more underlying technical issues of one or more of their devices, e.g., such as how to fix an issue with their phone. In this use case, operations described herein rephrase this text entry data using obtained IoT data without having to rely on users to provide the missing context. This rephrasing thereby eliminates processing of additional inquiry operations that would otherwise be performed in an attempt to determine the missing context. Accordingly, a relatively refined collection of data, e.g., one that includes at least the predetermined threshold of specificity, is provided to the determined chatbot server to thereby enable a relatively on point answer to be generated.

In another general approach, a computer program product includes a computer readable storage medium having program instructions embodied therewith. The program instructions are readable and/or executable by a computer to cause the computer to perform any combination of features of the foregoing methodology. Similar technical effects are obtained.

In another general approach, a system includes a processor, and logic integrated with the processor, executable by the processor, or integrated with and executable by the processor. The logic is configured to perform any combination of features of the foregoing methodology. Similar technical effects are obtained.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data evaluation and rephrasing code of block 150 for incorporating Internet of Things (IoT) data into chatbot text entry data. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As mentioned elsewhere herein, AI chatbots are relatively intelligent virtual agents designed to simulate human-like conversations. These chatbots employ NLP, machine learning, and other AI techniques to understand user queries, generate appropriate responses, and provide valuable information or assistance while interacting with user devices and/or input.

The IoT, on the other hand, includes a network of physical objects embedded with sensors, software, and connectivity, enabling data to be collected and exchanged within the network. These physical objects may include various devices such as smart appliances, wearable devices, environmental sensors, security cameras, and more. The data generated by these sensors provides valuable insights into the physical world, including temperature, humidity, motion, energy consumption, and other environmental factors.

Despite the utility offered by an AI chatbot, several factors often contribute to an AI chatbot not providing a relatively accurate answer to a user device in response to a question and/or data being input into an AI chatbot application of a user device. One of such factors is a "phrasing" of the input question and/or data. More specifically, in some use cases, in response to a question being improperly input into the AI chatbot and/or the questions including ambiguous language, e.g., unclear questions, nonspecific questions, etc., the AI chatbot may be unable to determine an intended meaning of the question. As a result, the AI chatbot may return a response that does not address and/or even relate to the intended meaning of the question. For instance, a user question, "How can I fix my phone?" provides relatively few details as to the surrounding context of an issue the user is having with their phone. In other words, the user question is somewhat ambiguous in that the type of issue is undefined, e.g., hardware issue, software issue, firmware issue, etc., the cause of the issue is undefined, e.g., the phone was dropped, the phone was exposed to moisture during a weather event, etc.

Another factor that often contributes to AI chatbots not providing a relatively accurate answer includes comprehension limitations. AI chatbots have certain limitations in understanding complex or nuanced questions. For example, in some cases in which a question is relatively intricate or calls for a relatively deep understanding of IoT data in real time, the AI chatbot may struggle to grasp the question fully and, as a result, provides an inaccurate or incomplete response. For instance, an AI chatbot may be unable to accurately answer the question, "What is the best laptop for gaming and work?" without being configured to analyze and balance computer performance metrics associated with gaming and a job that a user that input the question holds.

Yet another factor that often contributes to AI chatbots not providing a relatively accurate answer includes a lack of IoT data being accessible (in real time) to an AI chatbot that is called to provide the answer. This lack of access to IoT data thereby prevents the AI chatbot from accurately interpreting a question. Furthermore, without access to this background information, the AI chatbot makes assumptions and/or provides generic answers that fail to address a specific query. For instance, conventional AI chatbots do not have access to a sufficient amount of IoT data (in real time) in order to generate a detailed answer to the question "How do I fix my car". In other words, conventional AI chatbots are unable to provide a detailed and relatively accurate answer to such questions without real time access to additional data, e.g., such as human computer interaction (HCI) data and/or IoT data.

Ultimately, the factors described above prevent conventional AI chatbots from relatively accurately identifying an overall context of a question and/or data input into an AI chatbot application of a user device. As a result, answers that are generated by an engine of the AI chatbot and returned to the questioning user device often do not address and/or even relate to the intended meaning of the question. In order to remedy this inaccuracy, additional questions may be generated and submitted to the AI chatbot on the user device, which ultimately consumes additional processing resources of both the user device and the AI chatbot, frustrates the user of the user devices, takes additional time, etc. Accordingly, there is a longstanding need for defining techniques that mitigate the issues described above in AI chatbot environments and deployments. More specifically, there is a need for techniques that bridge modern AI and IoT technologies to facilitate immersive conversations, integrate IoT data into AI chatbot requests to enhance interactions with AI chatbots, and that create an immersive AI chatbot interface with an integrated IoT network in real time to refine AI chatbot conversational experiences.

In sharp contrast to the deficiencies described above, the techniques of approaches described herein provide a human computer interaction layer on top of multiple AI chatbots, bridge an IoT network and an AI chatbot in real time for relatively enhancing an immersive chat service, integrate IoT data into user device AI chatbot requests through interaction analysis, and create an immersive AI chatbot interface with an integrated IoT network in real time to relatively improve an AI chatbot conversational experience. These novel techniques improve efficiencies of devices that are used for communication between a user device and an AI chatbot by reducing an amount of questions that are ultimately generated and submitted to the AI chatbot. This reduces the relative consumption of processing resources of both the user device and the AI chatbot, as well as the time that returning a relatively accurate response to the questioning user device takes.

Figure 2:
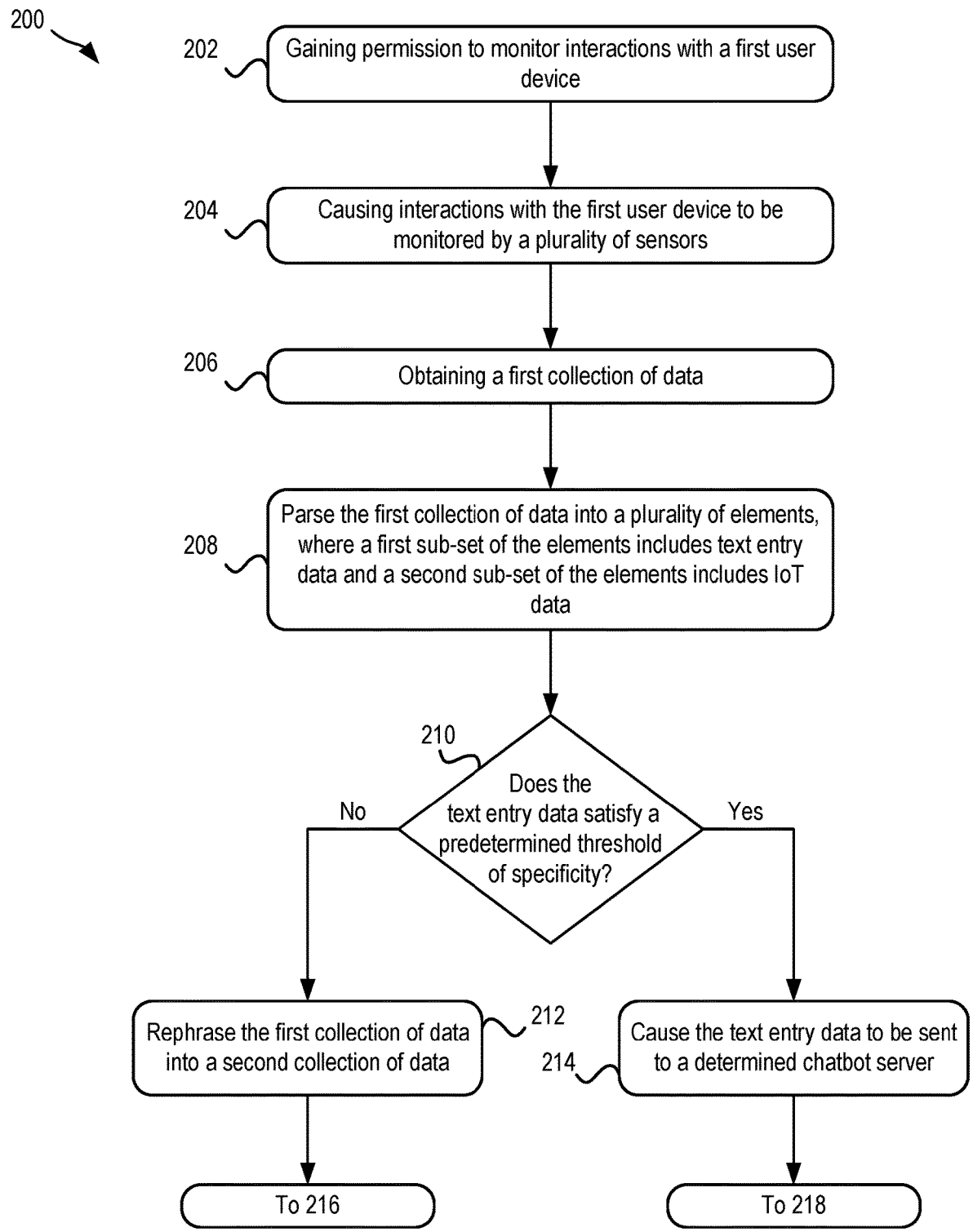
FIG. 2 is a flowchart of a method, in accordance with one approach of the present invention.
Figure 2:
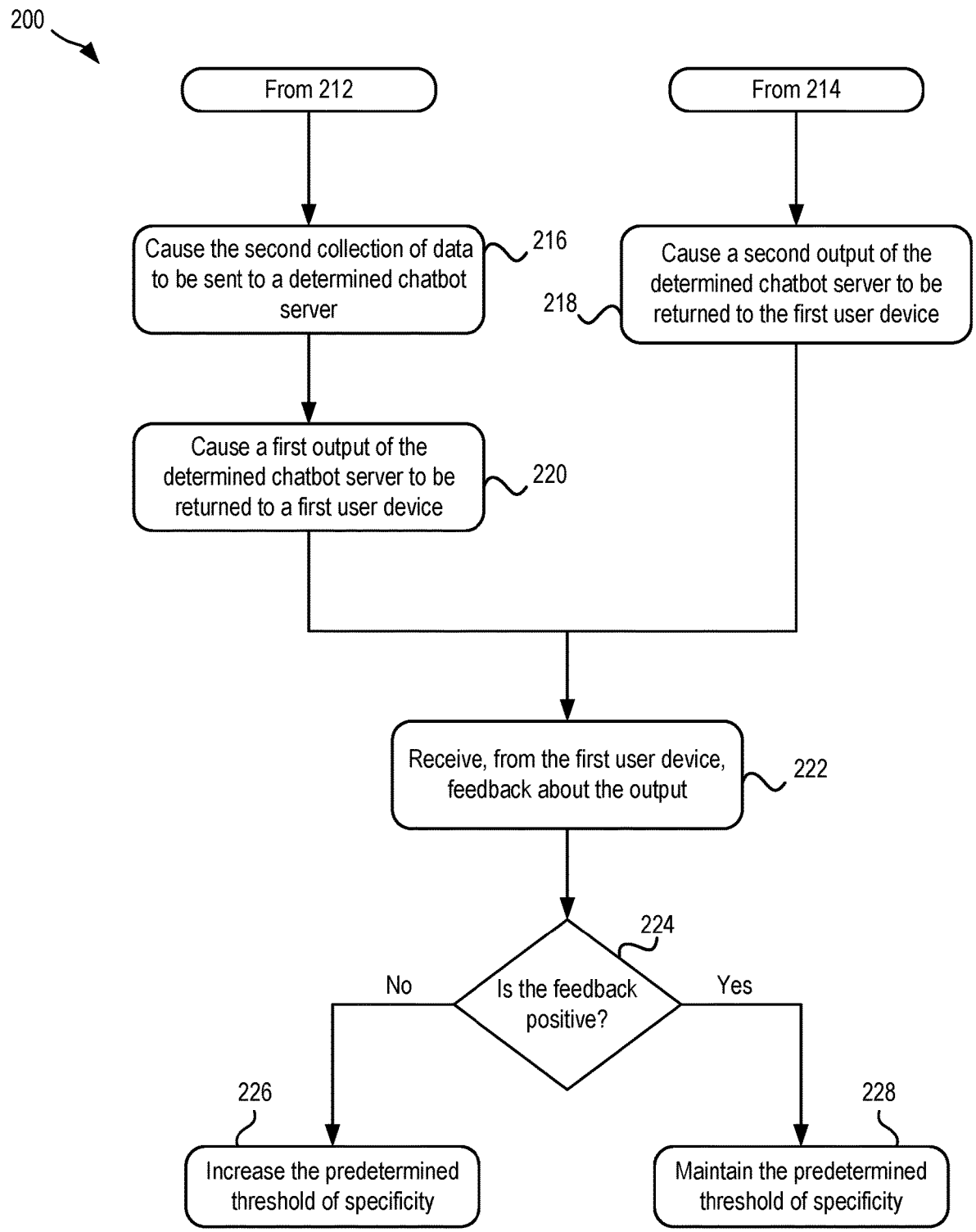

Now referring to FIG. 2, a flowchart of a method 200 is shown according to one approach. The method 200 may be performed in accordance with the present invention in any of the environments depicted in FIGS. 1-6, among others, in various approaches. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various approaches, the method 200 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 may be performed in a network environment in which one or more user devices, e.g., laptops, tablets, phones, etc., are configured to host a predetermined AI chatbot application, and user devices are configured to output information associated with the AI chatbot application to a predetermined AI chatbot server that is configured to perform one or more operations of method 200 to analyze the information using techniques described herein. In some other approaches, a first user device that hosts the predetermined AI chatbot application is configured to perform the operations of method 200. The network environment may additionally and/or alternatively include a plurality of additional AI chatbot servers, and one or more of such AI chatbot servers are preferably configured to determine an answer to questions that are input into the AI chatbot servers. An infrastructure of components associated with such a network environment is described in further detail elsewhere herein, e.g., see FIGS. 3-4.

It should be noted that any monitoring of user actions and/or behavior described herein is preferably only obtained subsequent to gaining permission from the associated users. For example, operation 202 includes gaining permission to monitor interactions with a first user device. The permission is preferably explicitly granted, and may be revoked by the associated users at any time and for any reason.

Operation 204 includes causing interactions with the first user device to be monitored by a plurality of sensors. These sensors may include, e.g., a thermometer, a motion detector, a voltage measurement instrument, a current flow measurement instrument, or any other type of sensor usable in a network environment that includes AI chatbots, as would become apparent to one skilled in the art after reading the present disclosure. The interactions with the first user device may depend on the approach. In some approaches, interactions with the first user device may include text input on the first device. In one or more of such approaches, the text input on the first device may be text entry data that includes a question that is entered into a chatbot interface of the first user device, e.g., a portal window for typing questions into in order to have the questions answered by an AI service. In some other approaches, the interactions with the first user device may result in IoT data being generated. For context, the IoT data may include any type of data generated by physical objects in a network environment that includes AI chatbots. In some approaches, IoT data includes metrics associated with the first user device and/or another predetermined device, where the metrics are generated based on an output of the sensors, e.g., based on reading(s) performed by the sensors. For example, in some approaches, the metrics may include temperature data that is generated based on one or more sensors measuring a temperature. A digital representation of the temperature reading may be generated to thereby establish a metric, which may be included in the IoT data. More specifically, the temperature may be, e.g., a temperature of a component of the first user device, a temperature of an environment that the first user device is located in, an estimated temperature of an environment that a predetermined user and/or device and/or event is scheduled to take place in, etc. In some other approaches, the metrics may include a measured amount of reclaimable storage space that exists on the first user device, a measured current data write rate of a data storage drive, etc. In one or more of these approaches, the IoT data may include the generated metrics, timestamp information about the measurements performed, information about the sensors used to perform the measurements, etc. The IoT information may additionally and/or alternatively include other types of information, such as device information, e.g., a software version of a predetermined device (which may be the first user device), a model number of the predetermined device, power usage measurements associated with the predetermined device (a number of times that a battery of the user device has been charged and/or discharged within a twenty-four hour period of time, whether an abnormal battery usage event has occurred, etc.), damage event information (impact and/or drop event of the first user device), etc. By being configured to process and analyze a diverse set of data types, the approaches described herein enable the techniques of method 200 to be deployed in a diverse set of environments.

A first collection of data is obtained, e.g., see operation 206. At least some of the information of the first collection of data is obtained as a result of performing the monitoring of the first user device. This may include a first collection of data that includes text entry data and/or IoT data. In some approaches in which the first collection of data includes both text entry data and IoT data, the IoT data may be integrated with the text entry data by an IoT data integrator component of the first user device. For context, the IoT data integrator component may, in some approaches, be a module for integrating the IoT data with request contents, e.g., a text question, of the text entry data. For instance, data of sensors in user devices may be integrated as collected IoT Data in a predetermined format, e.g., IoTList [IoTID][IoTData], in a request output by the first user device.

In some other approaches, the information is obtained directly from the one or more sensors. The information may additionally and/or alternatively be received from the first user device, e.g., in one or more approaches in which the operations of method 200 are not performed by the first user device but instead by an AI chatbot server. In yet some other approaches, the IoT data may, additionally and/or alternatively be obtained by direct monitoring and measurements performed by the AI chatbot server, while the text entry data may be received from the first user device that the text is input on, e.g., via a chatbot interface of the first user device. By obtaining a first collection of data that preferably includes text entry data and IoT data a surrounding context of the text entry data may be determined based on an analysis of the first collection of data. This way, in the event that the text entry data does not provide enough detail, e.g., a relatively detailed enough question, to generate a detailed answer, the IoT data may be used to determine a missing context without having to request that additional information be input into the AI chatbot application of the first user device.

Operation 208 includes parsing a first collection of data into a plurality of elements. In some approaches, text parsing techniques that would become apparent to one of ordinary skill in the art after reading the descriptions herein may be used to parse at least some of the data of the first collection of data into different elements. In some approaches, these text parsing techniques may include applying NLP to text of the first collection of data. Word relational techniques that would become apparent to one of ordinary skill in the art after reading the descriptions herein may be used to group words having at least a predetermined degree of similarity with one another in an element grouping. For context, in some preferred approaches, a first sub-set of the elements preferably includes text entry data, and a second sub-set of the elements preferably includes IoT data. In other words, in one or more of such approaches, the text entry data may be distinguished and maintained in different elements than the IoT data. This separation of the text entry data and the IoT data may, in some approaches, be established and at least initially maintained in order to determine whether the text entry data constitutes a question with at least a predetermined degree of specificity, or whether the IoT should be used to supplement the question in order to establish a question with both text entry data and IoT data that has at least the predetermined degree of specificity. A question that does not have at least the predetermined degree of specificity being processed by an AI chatbot server otherwise wastes processing resources because an answer returned by the AI chatbot server is relatively likely to not be on point, e.g., not answer an intended context of the question because the context is not discernible based on the lack of detail provided in the text entry data.

As indicated above, in some approaches, a determination is made as to whether the text entry data (of the first sub-set of the elements) satisfies the predetermined threshold of specificity, e.g., see decision 210. Determining whether the text entry data of the first sub-set of the elements satisfies the predetermined threshold of specificity, in some preferred approaches, includes determining whether an answer with at least a predetermined degree of detail exists for the text entry data. In some other approaches, determining whether the text entry data of the first sub-set of the elements satisfies the predetermined threshold of specificity includes determining whether, e.g., the text entry data includes at least a predetermined number of words, the text entry data includes at least a predetermined number of words that are not non-descriptive nominal words (e.g., "the", "a", "an", etc.), the text entry data includes at least a predetermined number of words from a predetermined list, etc.

In response to a determination that an answer with at least the predetermined degree of detail exists for the text entry data, the predetermined threshold of specificity is determined to be satisfied, e.g., as illustrated by the "Yes" logical path of decision 210. In contrast, in response to a determination that an answer with at least the predetermined degree of detail does not exist for the text entry data, the predetermined threshold of specificity is determined to be not satisfied, e.g., as illustrated by the "No" logical path of decision 210. It should be noted that the predetermined threshold of specificity may additionally and/or alternatively be determined to be satisfied or not be satisfied based on the result of any of the other factors described above, e.g., the predetermined number of words, a predetermined number of words that are not non-descriptive nominal words, etc.

In response to a determination that the text entry data of the first sub-set of the elements does not satisfy the predetermined threshold of specificity, the first collection of data is rephrased into a second collection of data, e.g., see operation 212. In other words, in order to provide a chatbot server (that at least some of the first collection of data will be routed to) with an amount of data that a relatively accurate answer can be generated from, a second collection of the data is generated in response to the determination that the text entry data of the first sub-set of the elements does not satisfy the predetermined threshold of specificity.

Rephrasing the first collection of data into the second collection of data, in some preferred approaches, includes identifying at least a first element of the second sub-set of the elements that includes IoT data that correlates to at least some of the text entry data. In one or more of such approaches, the first element of the second sub-set of the elements is one or more words and/or values that further define the at least some of the text entry data. Accordingly, in some approaches, the identification includes using correlation techniques that would become apparent to one of ordinary skill in the art after reading the present descriptions to determine whether one or more words and/or values of the text entry data are further defined by IoT data of the first element of the second sub-set of the elements. For example, assuming that the text entry data includes the text "How can I fix my phone?", IoT data that further defines (and thereby correlates with) the portion of the text entry data "phone" may be determined to include, e.g., a software version of the phone, a model number of the phone, a temperature of the phone, etc.

The identification of at least the first element of the second sub-set of the elements that includes IoT data that correlates to at least some of the text entry data establishes context that may otherwise be absent in a consideration of the text entry data alone. In other words, were a chatbot otherwise to merely consider the text "How can I fix my phone?", the chatbot server would not understand the relatively specific and detailed context that the IoT data, e.g., the software version of the phone, the model number of the phone, the temperature of the phone, etc., adds.

With at least some IoT data that correlates with at least some of the text entry data identified, rephrasing the first collection of data into the second collection of data may additionally and/or alternatively include integrating the at least some IoT data into the at least some of the text entry data. For example, in some approaches, the rephrasing may include using sentence structuring techniques and/or NLP techniques that would become apparent to one of ordinary skill in the art after reading the descriptions herein to place words and/or values of the IoT data into a question that includes the text entry data. Note that, in one or more of such approaches, the rephrasing may additionally and/or alternatively include adding some words into the first collection of data to thereby establish the second collection of data. For example, the text "How can I fix my phone?" may be rephrased into a second collection of data that includes, "How can I fix a battery charging problem with abnormal temperature (60 degrees C.) in my phone type 1 with operating system type 1?". Without this rephrasing, a chatbot server that would otherwise process the text entry data may potentially generate and return a relatively inaccurate answer, e.g., how to replace a screen of phone type 2, and/or a relatively general answer that is not helpful, e.g., provide a general customer support number. The rephrasing may additionally and/or alternatively include removing some words from the first collection of data to thereby establish the second collection of data. For example, IoT data that is determined to not correlate with any of the text entry data may be optionally removed from the first collection of data to thereby establish the second collection of data. The second collection of data, in some preferred approaches, is a question for a chatbot server to answer.

Operation 216 includes causing the second collection of data to be sent to a determined chatbot server. Depending on infrastructure in which method 200 is performed, in some approaches, a plurality of potential chatbot servers may be available for fulfilling a collection of data that is provided to the chat bot server(s). Accordingly, method 200 optionally includes determining a chatbot server from a plurality of potential chatbot servers. Determination of the chatbot server from the plurality of potential chatbot servers may, in some approaches, be based on preference information of a user that entered the text entry data on the first user device. In some approaches, this preference information is included in the first collection of data, while in some other approaches, the preference information is obtained from a query that is output to and/or presented to the user via the AI chatbot application of the first user device. The preference information may detail user preferences that are to be applied during fulfillment of a question contained in and/or generated using the first collection of information. For example, the preference information may include, e.g., one or more chatbot servers of the plurality of potential chatbot servers that the user prefers to be used, one or more chatbot servers of the plurality of potential chatbot servers that the user prefers to not be used, a total number of chatbot servers that are to be used, whether or not to randomly select one of the potential chatbot servers to use, whether or not to randomly select one of the potential chatbot servers to not use, etc. The preference information is preferably used to determine the chatbot server that the second collection of data is sent to.

The second collection of data is caused to be sent to the determined chatbot server in order to have the determined chatbot server generate an answer for a question of the second collection of data. Accordingly, in some approaches, the second collection of data is sent to the determined chatbot server with an instruction to determine and/or return an answer.

Operation 220 includes causing a first output of the determined chatbot server to be returned to the first user device. For context, in some preferred approaches, the first output is an answer to the second collection of data. The first output is output to a first user device in order to provide the user that entered at least some of the text entry data an answer to a question of the text input data. In some approaches in which method 200 is performed by the first user device, causing the first output of the determined chatbot server to be returned to the first user device may include adding an instruction in the second collection of data sent to the determined chatbot server to return the first output to the first user device. In some other approaches in which method 200 is performed by another device, e.g., a server that is different than the first user device and that is different than the determined chatbot server, causing the first output of the determined chatbot server to be returned to the first user device may include receiving the first output from the determined chatbot server, and outputting the first output to the first user device.

In some approaches, causing the first output of the determined chatbot server to be returned to a first user device includes rendering the first output of the determined chatbot server to a predetermined sentence structure. For example, in some approaches, NLP may be used to determine that at least some of the first output is not readable user text. In response to such a determination, techniques that would become apparent to one of ordinary skill in the art may be used to render the first output into readable user text, e.g., sentence structuring techniques may be applied to render the first output to readable user text. The rendering allows the first output to be delivered to the user device in a form that can be presented to the user that input at least some of the text entered into the chatbot interface of the first user device. This rendering reduces the amount of data that is ultimately transmitted to the first user device in the event that the rendering cuts out at least some of the first output that is determined to not be of the form that can be presented to the user. Furthermore, this rendering mitigates device processing operations that would otherwise potentially be performed in order to clarify a meaning of the first output, e.g., a request for clarification returned by the first user device. Causing the first output of the determined chatbot server to be returned to the first user device may additionally and/or alternatively include outputting the rendered first output to the first user device.

Referring back to decision 210, in response to a determination that the text entry data of the first sub-set of the elements satisfies the predetermined threshold of specificity, e.g., see logical path "Yes" of decision 210, method 200 includes not rephrasing the first collection of data into a second collection of data, and instead causing the text entry data of the first collection of data to be sent to the determined chatbot server, e.g., see operation 214. Operation 218 includes causing a second output of the determined chatbot server, e.g., an output based on the first collection of data, to be returned to the first user device. Note that, in some preferred approaches, the second output is an answer to the text entry data of the first collection of data. By causing only the text entry data of the first collection of data to be sent to the determined chatbot server in response to the determination that the text entry data of the first sub-set of the elements satisfies the predetermined threshold of specificity, the processing resources that would otherwise be consumed in generating and outputting the second collection of data are preserved.

In some approaches, method 200 includes receiving and using user feedback in order to relatively refine the accuracy of answers produced during subsequent iterations of processing collections of data. For example, operation 222 includes receiving, from the first user device, feedback about the first output. In order to determine whether thresholds used in the process of generating the first output should be adjusted, e.g., based on the thresholds resulting in one or more instances of dissatisfactory feedback, method 200 may include determining whether the feedback is positive feedback, e.g., see decision 224. Determining whether the feedback is positive feedback may include using NLP techniques to parse the feedback about the first output to determine whether the feedback about the first output includes one or more predetermined words associated with negative feedback, e.g., unhappy, disapprove, upsetting, what does this mean, I do not understand, etc. In contrast, determining whether the feedback is positive feedback may additionally and/or alternatively include using NLP techniques to parse the feedback about the first output to determine whether the feedback about the first output includes one or more predetermined words associated with positive feedback, e.g., happy, yay, approve, great, I understand, perfect, thank you, etc. In response to a determination, e.g., see "No" logical path of decision 224, that the feedback is not positive feedback, e.g., is a complaint, the consumer is dissatisfied, etc., method 200 includes increasing the predetermined threshold of specificity, e.g., see operation 226. In contrast, in response to a determination, e.g., see "Yes" logical path of decision 224, that the feedback is positive feedback, e.g., is a positive review, the consumer is satisfied, etc., method 200 includes maintaining the current predetermined threshold of specificity, e.g., see operation 228.

Various performance benefits are enabled as a result of implementing the techniques described herein in network environments that include AI chatbots. Although several of these performance benefits are described above throughout the operations of method 200, additional performance benefits are detailed below. For example, the operations described enable real-time contextual information to be selectively integrated into and supplement inquiries input into AI chatbot interfaces. This integration is made possible by IoT sensors and enables a chatbot server to access real-time data from a physical environment that a question is based on. This furthermore provides up-to-date and contextual information to enhance the accuracy and relevance of responses that are generated by chatbot servers.

Personalized interactions of a user and an AI chatbot interface are also enabled by implementing the techniques described herein. More specifically, by leveraging and analyzing the IoT sensor data, the chatbot servers are caused to generate personalized recommendations, suggestions, and actions based on the specific needs and preferences of individual users. This creates a relatively more tailored and engaging conversational experience than users would otherwise experience without considering IoT while processing chatbot text input.

Several efficiencies are also enabled using the techniques described herein. More specifically, the combination of AI chatbot capabilities and IoT sensors enables streamlined and efficient processes that would not otherwise be available by merely considering text input data. This enables user devices to obtain information, control devices, and/or perform tasks relatively quickly and conveniently through natural language conversations, eliminating the need for manual operations. Relatively improved decision-making processes are also enabled. The operations described herein enable an IoT chatbot to analyze data from IoT sensors and provide valuable insights and recommendations to users that are relatively more accurate than conventional chatbot responses that do not consider IoT data. This helps in making informed decisions related to energy optimization, security, maintenance, or other areas where IoT data is leveraged.

Automation and control of the process of fulfilling a question is also enabled as a result of deploying the techniques described herein. Various actions and control strategies are able to be automated based on the data from IoT sensors. This allows for proactive monitoring, automated adjustments, and timely interventions, reducing manual efforts and optimizing operations.

User engagement is also promoted using the techniques described herein as the immersive and real time nature of the automated processing operations described herein facilitate engaging and interactive conversations. This enables users to receive real-time updates. Scalability and flexibility is furthermore enabled using the techniques described herein. Specifically, these techniques can be deployed in various environments and scaled to accommodate different IoT sensor networks that contain a wide range of sensors. This establishes a relatively flexible solution for different industries and use cases, while empowering AI-chat trustworthiness and accuracy.

Figure 3:
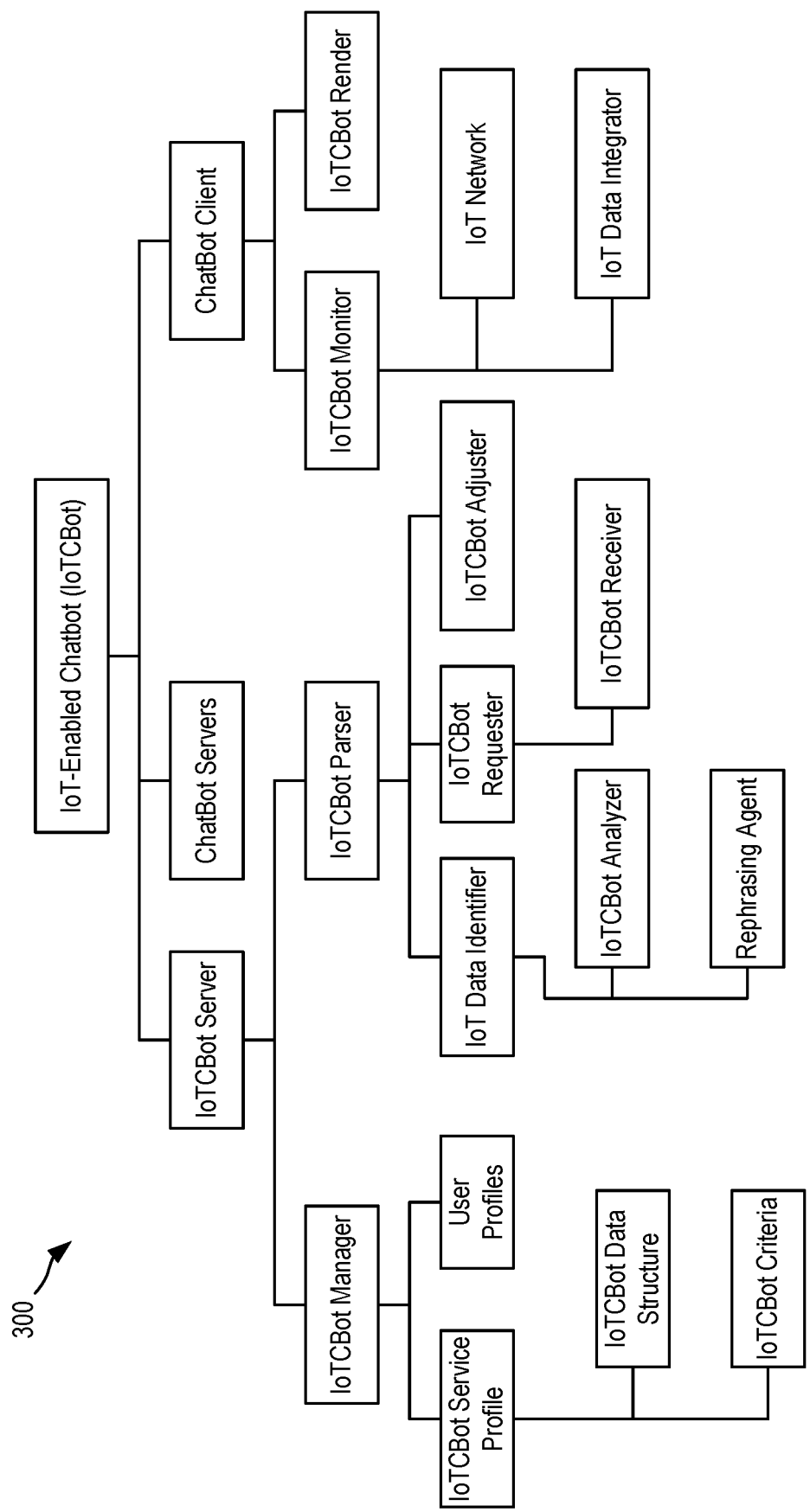
FIG. 3 is an infrastructure, in accordance with one approach of the present invention.

FIG. 3 depicts an infrastructure 300, in accordance with one approach. As an option, the present infrastructure 300 may be implemented in conjunction with features from any other approach listed herein, such as those described with reference to the other FIGS. Of course, however, such infrastructure 300 and others presented herein may be used in various applications and/or in permutations which may or may not be specifically described in the illustrative approaches listed herein. Further, the infrastructure 300 presented herein may be used in any desired environment.

It may be prefaced that the infrastructure 300 includes components associated with a network environment in which the operations of method 200 may be performed. The infrastructure 300 includes an IoT-enabled chatbot (IoTCBot) that may be deployed via a chatbot server application (IoTCBot Server), a plurality of potential chatbot servers ("ChatBot Servers") for answering a collection of data, and a user device and/or plugin and/or application, e.g., a "ChatBot Client". In some approaches, the IoTCBot Server is a server application for supporting IoTCBot Client as a HCI layer on top of a AIChatbot service bridging IoT network analysis and AI-Chatbot for supporting immersive chat sessions.

A manager component of the IoTCBot Server may include a user interface for allowing users to indicate IoTCBot settings preference, e.g., authentication of AI-chatbot servers, authorized IoT networks, etc., and criteria, e.g., access restrictions on IoT sensors and IoT data, supported chatbot server list, etc. Profiles, e.g., see IoTCBot Service Profile, may be a configuration file for saving the configured IoTCBot settings, and the IoTCBot Data Structure may be a data structure with related algorithms for tracking and editing content in a current window. In some approaches, the data of the IoTCBot Data Structure (IoTCBot_Data) may include, e.g., UserID, ChatBotID, QuestionID, IoTList[IoTID][IoTData], OriginalRequest, IoTEnhancedRequest, OriginalAnswer, IoTEnahncedAnswer, etc. User profiles may be used to determine the user preferences that are to be applied during fulfillment of a question, as described elsewhere herein, e.g., see method 200.

IoT chatbot criteria (IoTCBot Criteria), in some approaches, is a set of configuration rules for, e.g., connecting IoT network, types of IoT devices and sensors, collecting IoT Data, supported chatbot server list, etc. Admins and users may provide input that is used to define and/or customize the IoTCBot Criteria for meeting preferences and needs. For example, such input may include when and where data of a location sensor can be defined and controlled by a user. The IoTCBot Parser may, in some approaches, be a module for parsing a user request and integrating IoT context information into different elements in about real time, e.g., the original question, IoT data, etc. Furthermore, the IoT Data Identifier may be a module for identifying useful IoT data correlated to the request.

The IoTCBot Analyzer is a module for analyzing the identified IoT data to determine whether to rephrase the original requests of a first collection of data. Based on this determination, a Rephrasing Agent may be selectively used, which is a module for rephrasing and converting the user request to include relatively more specific questions, e.g., text entry data with integrated IoT data. The IoTCBot Requester is a module configured for sending the rephrased request to a user requested AI-Chatbot. The IoTCBot receiver is configured to receive a response from the AI-Chatbot and pass the response to the IoTCBot Client. The IoTCBot Adjuster is a module for adjusting the IoTCBot Criteria and related settings according to feedback of the users.

The IoT Network is configured to connect a plurality of sensors in different devices, e.g., a vehicle, a mobile phone, wearable devices, a smart home, a smart building, a smart road, a smart city, etc. The IoTCBot Client may, in some approaches, be a plugin and/or application which can be installed in application/application level for supporting immersive chats. The IoTCBot Monitor is a module for monitoring human computer interactions, e.g., input buffer, viewed contents, feedbacks, etc., in an AI-Chat. For example, information that may be monitored and determined from a client application may include, e.g., a new user request "How can I fix my phone?", a phone has been charged more than three times in twelve hours, a battery status has changed abnormally, a phone version, a phone software version, an IoT message: "Charging on Hold", a battery temperature: 60° C., etc.

The IoT Data Integrator is a module for integrating the IoT data, e.g., data of sensors in user devices, with request contents. For example, collected IoT data may be integrated as in a predetermined format of "IoTList[IoTID][IoTData]" with a user original request "How can I fix my phone?", and the resulting integrated request may be sent to the IoTCBot Server. The IoTCBot Render is a module for rendering the returned AI-Chatbot response (from the IoTCBot) in the IoTCBot Client.

Figure 4:
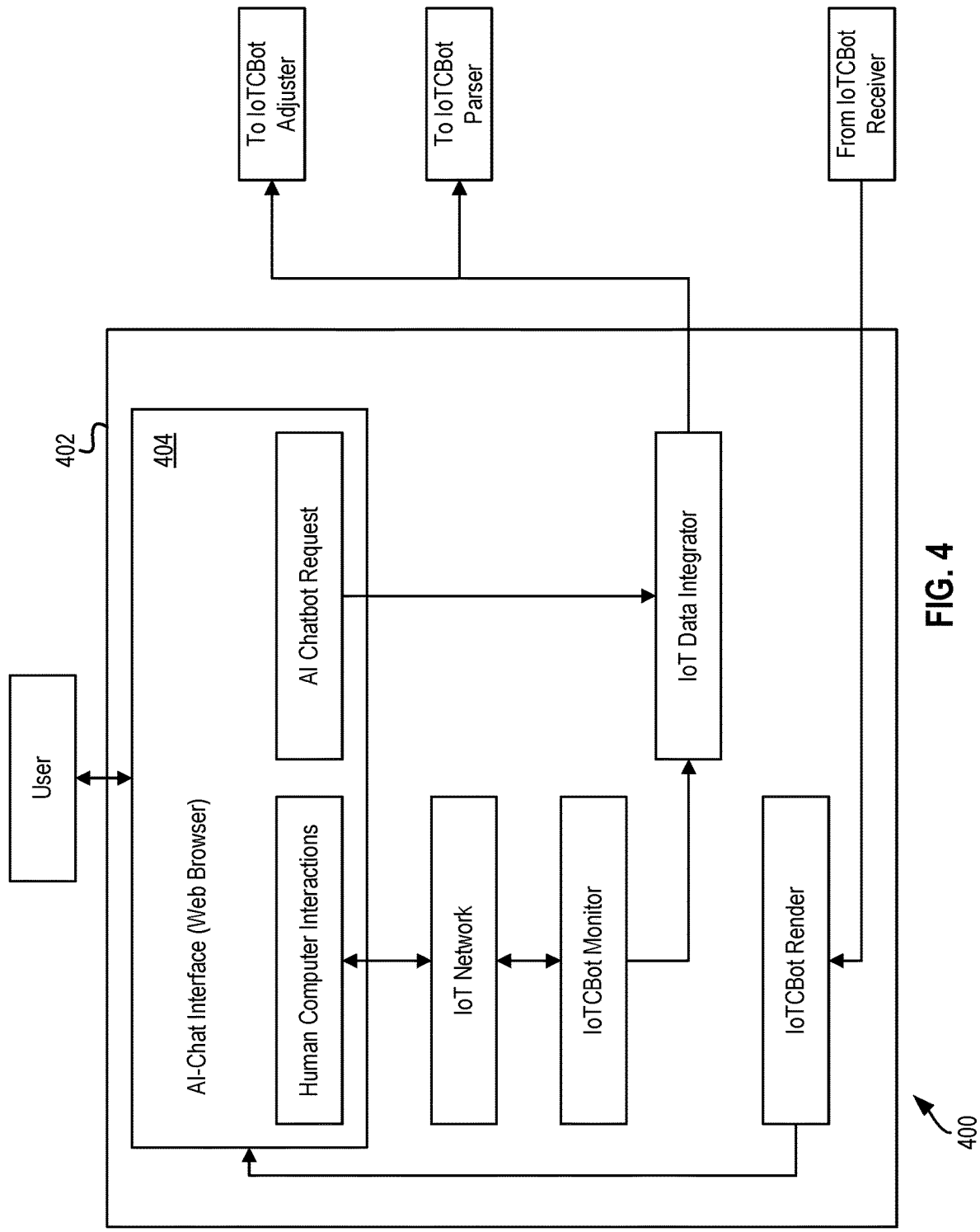
FIG. 4 is an infrastructure, in accordance with one approach of the present invention.
Figure 4:
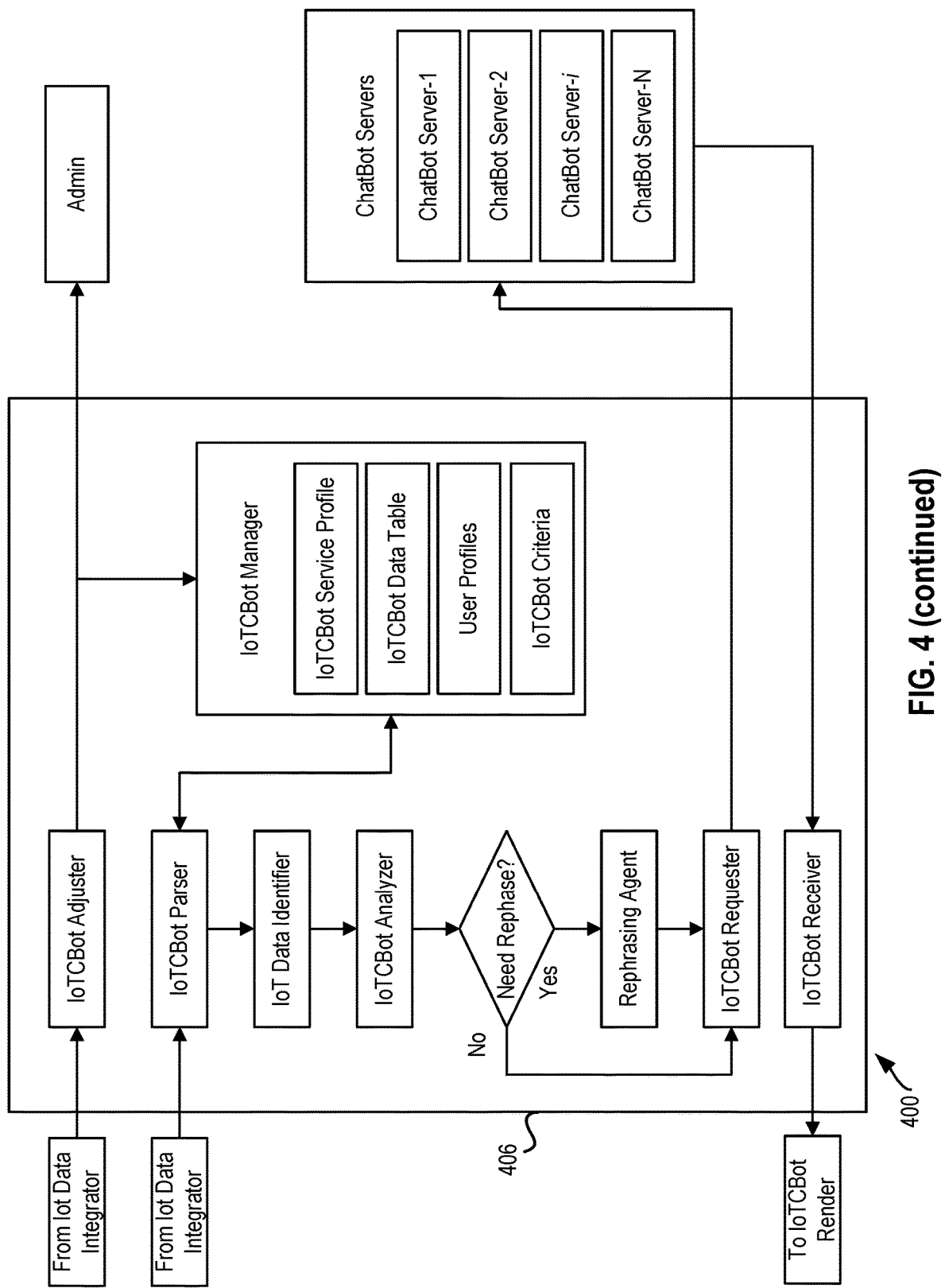

FIG. 4 depicts an infrastructure 400, in accordance with one approach. As an option, the present infrastructure 400 may be implemented in conjunction with features from any other approach listed herein, such as those described with reference to the other FIGS. Of course, however, such infrastructure 400 and others presented herein may be used in various applications and/or in permutations which may or may not be specifically described in the illustrative approaches listed herein. Further, the infrastructure 400 presented herein may be used in any desired environment.

The infrastructure 400 includes an IoT chatbot client 402 (IoTCBot Client) that may be, e.g., a user device, an interface, etc., and is configured to receive input by a user, e.g., see User, on an AI chat interface 404, e.g., such as a web browser. The AI chat interface 404 is configured to monitor for human computer interactions that is recorded as data, e.g., metadata. This monitoring may be caused to be performed in a network, e.g., see IoT Network, and/or by one or more predetermined monitoring devices, e.g., see IoTCBot Monitor. Text entry may additionally and/or alternatively be received on the interface, e.g., see AI Chatbot Request. Data caused to be obtained by monitoring and the text entry data may be added to a first collection of data by a predetermined integrator component, e.g., see IoT Data Integrator, that is output to one or more predetermined targets, e.g., see "To IoTCBot Adjuster" and "To IoTCBot Parser" of an IoT server 406 (IoTCBot Server).

The IoT server 406 may parse (by the IoTCBot Parser) the first collection of data into a plurality of elements that includes a first sub-set of elements that includes the text entry data and a second sub-set of the elements that includes the IoT data. An identifier component (IoT Data Identifier) and/or analyzer component (IoTCBot Analyzer) may be used to determine whether the text entry data of the first sub-set of the elements satisfies a predetermined threshold of specificity, e.g., see decision "Need Rephrase", and in response to a determination that the predetermined threshold of specificity is not satisfied, the first collection of data is rephased into a second collection of data by a rephrasing component, e.g., see Rephrasing Agent. In contrast, in response to a determination that the predetermined threshold of specificity is satisfied, the first collection of data is maintained and submitted to a determined chatbot server of a plurality of potential chatbot servers, e.g., see IoTCBot Requester submission to ChatBot Servers. It should be noted that this determination may be based on user preferences in some approaches. For example, an IoTCBot Adjuster component may be configured to input received preference information and input the information into a predetermined storage module, e.g., see IoTCBot Manager, and/or relay the information to a predetermined administrator device, e.g., see Admin. In some approaches, the predetermined storage module includes organized tables of information that are applied to logic that is performed to determine which chatbot server to send the first collection of data and/or the second collection of data to. For example, in some approaches, the predetermined storage module includes, e.g., see IoTCBot Service Profile, IoTCBot Data Table, User Profiles, and IoTCBot Criteria.

An output of the determined chatbot server is received, e.g., see IoTCBot Receiver, and caused to be returned to the IoT chatbot client 402. In some approaches, the output is rendered by the IoT server 406 before being output, while in some other approaches, the IoT server 406 causes a rendering component of the IoT server 406 to render the output for display on the interface, e.g., see IoTCBot Render.

FIG. 5 depicts a table 500, in accordance with one approach. As an option, the present table 500 may be implemented in conjunction with features from any other approach listed herein, such as those described with reference to the other FIGS. Of course, however, such table 500 and others presented herein may be used in various applications and/or in permutations which may or may not be specifically described in the illustrative approaches listed herein. Further, the table 500 presented herein may be used in any desired environment.

Table 500 includes a plurality of timestamp entries. In a first timestamp, e.g., see Time-1, a collection of data is not received and therefore, processing of a collection of data is not performed, e.g., see NULL. Thereafter, in a second timestamp, e.g., see Time-2, a first collection of data associated with a first user, e.g., see user 01, is received. The first collection of data is indexed by an ID in the table, e.g., see Q001. The first collection of data is parsed into a plurality of elements that includes a first sub-set of elements that includes the text entry data and a second sub-set of the elements that includes the IoT data. For example, the text entry data includes an original question input into a chatbot window (Chatbot01), e.g., see "How can I fix my phone?". A determination may be made that the original question does not satisfy a predetermined threshold of specificity, and therefore, the first collection of data may be rephrased into a second collection of data. More specifically, at least some of the IoT data of the first collection of data, e.g., see "Phone type 1, operating system type 1 message: 'Charging on Hold'; Battery Temperature: 60 degrees C.", may be incorporated into the text entry data to define the second collection of data. The second collection of data includes significantly more context, e.g., see IoTEnhancedRequest "How can I fix a battery charging problem with abnormal temperature (60 degrees C.) in my phone type 1, operating system type 1?". The output of a chatbot server includes relatively significantly more detail than the output would otherwise include without the second collection of data being created. For example, the IoTEnhancedAnswer specifies "Yes, this is a known problem because of defect XYZ in operating system type 1. Please update your operating system to type 2", while the answer of the output would otherwise only generically specify "Are you using phone type 1 or type 2? Please call an 800 number to get customer support." without the additional context offered in the second collection of data.

Chatbot use cases differ depending on the approach. For example, a user may be asking for troubleshooting steps to fix a specific issue with their phone, a user may be seeking suggestions on repairing a physically damaged phone, a user may be referring to software or app-related problems, etc., but these details may be unclear without the incorporation of IoT information. In other words, a chatbot server may struggle to provide an accurate answer tailored to the user's specific situation without the user's text entry data being supplemented with IoT data. In another use case, text entry data may ask "What is the best laptop for gaming and work?", however, this question lacks detail. Accordingly, this question of a first collection of data may be rephrased into a relatively more accurate question that includes different HCI and IoT data in real time. This rephrasing may detail an intended question of the user, such as the user may have intended to ask for a recommendation for a laptop that can handle both gaming and work-related tasks efficiently. Without the added IoT data, a chatbot server may struggle to understand the user's preferences, budget constraints, and specific requirements in terms of gaming and work, thereby making it challenging to provide a precise answer that suits the user's needs. In yet another use case, text entry data that lacks sufficient specificity may include the query "How do I fix my car?" The user may be seeking guidance on troubleshooting a specific issue with their car, looking for general maintenance tips, asking for advice on finding a reliable mechanic, etc. The lacking context may be provided by rephrasing the original text entry data into relatively more accurate requests by incorporating different HCI and IoT data in real time.

Figure 6:
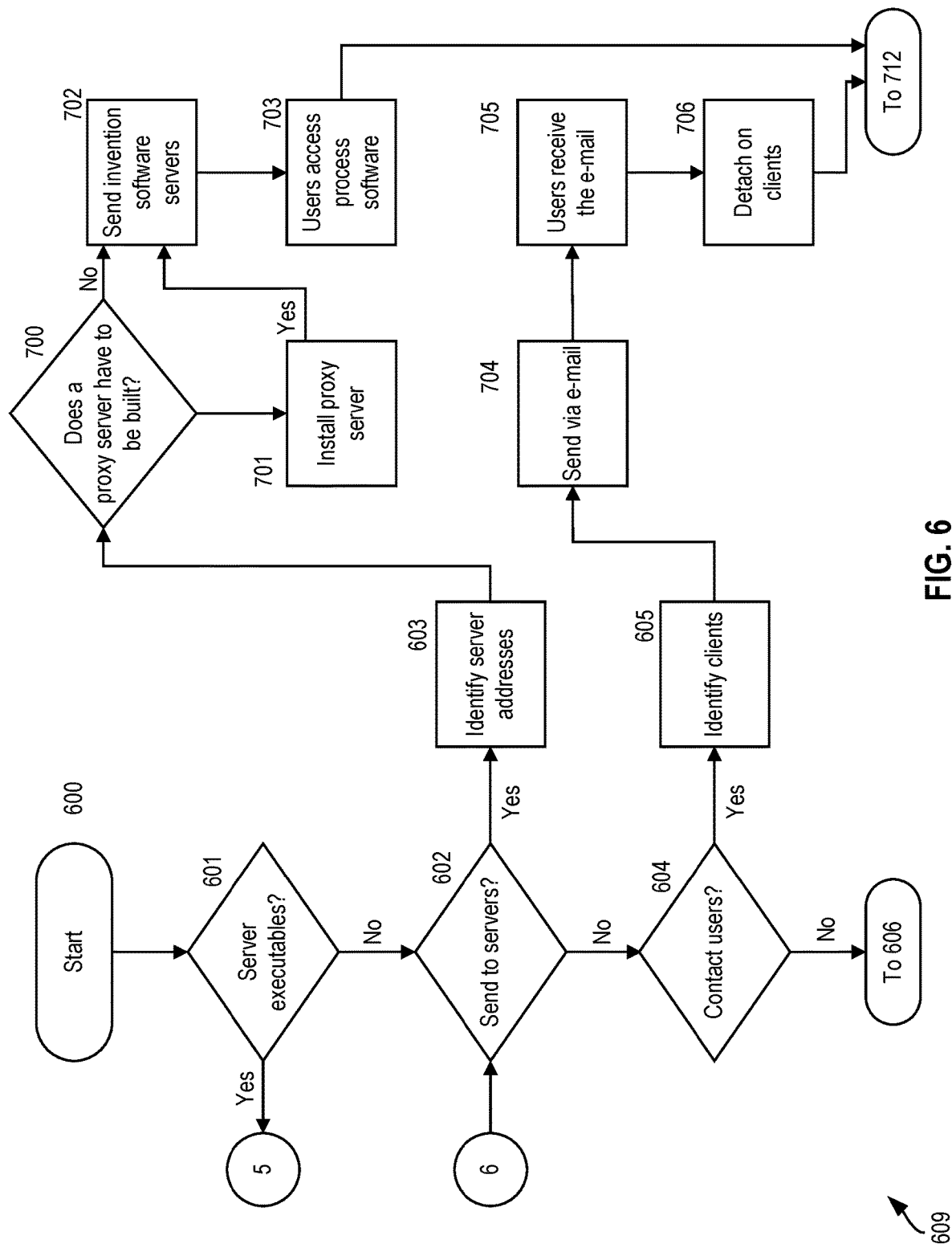
FIG. 6 is a flowchart of a method, in accordance with one approach of the present invention.

Now referring to FIG. 6, a flowchart of a method 609 is shown according to one approach. The method 609 may be performed in accordance with the present invention in any of the environments depicted in FIGS. 1-6, among others, in various approaches. Of course, more or fewer operations than those specifically described in FIG. 6 may be included in method 609, as would be understood by one of skill in the art upon reading the present descriptions.

Each of the steps of the method 609 may be performed by any suitable component of the operating environment. For example, in various approaches, the method 609 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 609. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for incorporating IoT data into chatbot text entry data may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 600 begins the deployment of the process software. An initial step is to determine if there are any programs that will reside on a server or servers when the process software is executed (601). If this is the case, then the servers that will contain the executables are identified (709). The process software for the server or servers is transferred directly to the servers' storage via FTP or some other protocol or by copying though the use of a shared file system (710). The process software is then installed on the servers (711).

Next, a determination is made on whether the process software is to be deployed by having users access the process software on a server or servers (602). If the users are to access the process software on servers, then the server addresses that will store the process software are identified (603).

A determination is made if a proxy server is to be built (700) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (701). The process software is sent to the (one or more) servers either via a protocol such as FTP, or it is copied directly from the source files to the server files via file sharing (702). Another approach involves sending a transaction to the (one or more) servers that contained the process software, and having the server process the transaction and then receive and copy the process software to the server's file system. Once the process software is stored at the servers, the users via their client computers then access the process software on the servers and copy to their client computers file systems (703). Another approach is to have the servers automatically copy the process software to each client and then run the installation program for the process software at each client computer. The user executes the program that installs the process software on his client computer (712) and then exits the process (608).

In step 604 a determination is made whether the process software is to be deployed by sending the process software to users via e-mail. The set of users where the process software will be deployed are identified together with the addresses of the user client computers (605). The process software is sent via e-mail (704) to each of the users' client computers. The users then receive the e-mail (705) and then detach the process software from the e-mail to a directory on their client computers (706). The user executes the program that installs the process software on his client computer (712) and then exits the process (608).

Lastly, a determination is made on whether the process software will be sent directly to user directories on their client computers (606). If so, the user directories are identified (607). The process software is transferred directly to the user's client computer directory (707). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (708). The user executes the program that installs the process software on his client computer (712) and then exits the process (608).

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
   parsing a first collection of data into a plurality of elements, wherein a first sub-set of the elements includes text entry data and a second sub-set of the elements includes Internet of Things (IoT) data;
   in response to a determination that the text entry data does not satisfy a predetermined threshold of specificity that is selectively adjusted based on user feedback, rephrasing the first collection of data into a second collection of data;
   causing the second collection of data to be sent to a determined chatbot server; and
   causing a first output of the determined chatbot server to be returned to a first user device, wherein the first output is an answer to the second collection of data.

2. The computer-implemented method of claim 1, wherein the text entry data is a question that was entered into a chatbot interface of the first user device.

3. The computer-implemented method of claim 2, wherein the IoT data includes metrics generated based on measurements performed by sensors, wherein the IoT data includes device information.

4. The computer-implemented method of claim 1, wherein rephrasing the first collection of data into the second collection of data includes: identifying a first element of the second sub-set of the elements that includes IoT data that correlates to the text entry data; and integrating the IoT data of the first element in the text entry data.

5. The computer-implemented method of claim 1, comprising: in response to a determination that the text entry data satisfies the predetermined threshold of specificity, causing the text entry data to be sent to the determined chatbot server; and causing a second output of the determined chatbot server to be returned to the first user device, wherein the second output is an answer to the text entry data.

6. The computer-implemented method of claim 1, comprising: determining whether the text entry data satisfies the predetermined threshold of specificity, wherein determining whether the text entry data satisfies the predetermined threshold of specificity includes: determining whether an answer with at least a predetermined degree of detail exists for the text entry data; and in response to a determination that an answer with at least the predetermined degree of detail exists for the text entry data, determining that the predetermined threshold of specificity is satisfied.

7. The computer-implemented method of claim 1, wherein causing the first output of the determined chatbot server to be returned to a first user device includes: rendering the first output of the determined chatbot server to a predetermined sentence structure, and outputting the rendered first output to the first user device.

8. The computer-implemented method of claim 1, wherein selectively adjusting the predetermined threshold of specificity based on user feedback includes:
   receiving, from the first user device, feedback about the first output;
   determining whether the feedback is positive feedback; and
   in response to a determination that the feedback is not positive feedback, increasing the predetermined threshold of specificity.

9. The computer-implemented method of claim 1, comprising:
   causing interactions with the first user device to be monitored by a plurality of sensors, wherein information obtained as a result of the monitoring is the IoT data; and
   determining the chatbot server from a plurality of potential chatbot servers, wherein the chatbot server is determined based on preference information of a user that entered the text entry data on the first user device.

10. A computer program product, the computer program product comprising a computer readable storage medium having program instructions embodied therewith, the program instructions readable and/or executable by a computer to cause the computer to:
    parse a first collection of data into a plurality of elements, wherein a first sub-set of the elements includes text entry data and a second sub-set of the elements includes Internet of Things (IoT) data;
    in response to a determination that the text entry data does not satisfy a predetermined threshold of specificity, rephrase the first collection of data into a second collection of data;

cause the second collection of data to be sent to a determined chatbot server;

cause a first output of the determined chatbot server to be returned to a first user device, wherein the first output is an answer to the second collection of data; and selectively adjust the predetermined threshold of specificity based on user feedback.

11. The computer program product of claim 10, wherein the text entry data is a question that was entered into a chatbot interface of the first user device.

12. The computer program product of claim 11, wherein the IoT data includes metrics generated based on measurements performed by sensors, wherein the IoT data includes device information.

13. The computer program product of claim 10, wherein rephrasing the first collection of data into the second collection of data includes: identifying a first element of the second sub-set of the elements that includes IoT data that correlates to the text entry data; and integrating the IoT data of the first element in the text entry data.

14. The computer program product of claim 10, the program instructions readable and/or executable by the computer to cause the computer to: in response to a determination that the text entry data satisfies the predetermined threshold of specificity, cause the text entry data to be sent to the determined chatbot server; and cause a second output of the determined chatbot server to be returned to the first user device, wherein the second output is an answer to the text entry data.

15. The computer program product of claim 10, the program instructions readable and/or executable by the computer to cause the computer to: determine whether the text entry data satisfies the predetermined threshold of specificity, wherein determining whether the text entry data satisfies the predetermined threshold of specificity includes: determining whether an answer with at least a predetermined degree of detail exists for the text entry data; and in response to a determination that an answer with at least the predetermined degree of detail exists for the text entry data, determine that the predetermined threshold of specificity is satisfied.

16. The computer program product of claim 10, wherein causing the first output of the determined chatbot server to be returned to a first user device includes: rendering the first output of the determined chatbot server to a predetermined sentence structure, and outputting the rendered first output to the first user device.

17. The computer program product of claim 10, wherein selectively adjusting the predetermined threshold of specificity based on user feedback includes:

receiving, from the first user device, feedback about the first output;

determining whether the feedback is positive feedback; and in response to a determination that the feedback is not positive feedback, increasing the predetermined threshold of specificity.

18. The computer program product of claim 10, the program instructions readable and/or executable by the computer to cause the computer to:

cause interactions with the first user device to be monitored by a plurality of sensors, wherein information obtained as a result of the monitoring is the IoT data; and determine the chatbot server from a plurality of potential chatbot servers, wherein the chatbot server is determined based on preference information of a user that entered the text entry data on the first user device.

19. A system, comprising:

a processor; and logic integrated with the processor, executable by the processor, or integrated with and executable by the processor, the logic being configured to:

parse a first collection of data into a plurality of elements, wherein a first sub-set of the elements includes text entry data and a second sub-set of the elements includes Internet of Things (IoT) data;

in response to a determination that the text entry data does not satisfy a predetermined threshold of specificity, rephrase the first collection of data into a second collection of data;

cause the second collection of data to be sent to a determined chatbot server;

cause a first output of the determined chatbot server to be returned to a first user device, wherein the first output is an answer to the second collection of data; and increase the predetermined threshold of specificity in response to receiving, from the first user device, negative feedback about the first output.

20. The system of claim 19, wherein the text entry data is a question that was entered into a chatbot interface of the first user device.

* * * * *